(12) United States Patent
Kaneko

(10) Patent No.: US 9,798,563 B2
(45) Date of Patent: Oct. 24, 2017

(54) NETWORK MANAGEMENT DEVICE, INFORMATION PROCESSING SYSTEM, AND PROGRAM

(71) Applicant: FUJITSU LIMITED, Kawasaki-shi, Kanagawa (JP)

(72) Inventor: Tsutomu Kaneko, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 14/660,241

(22) Filed: Mar. 17, 2015

(65) Prior Publication Data

US 2015/0268981 A1 Sep. 24, 2015

(30) Foreign Application Priority Data

Mar. 20, 2014 (JP) .................................. 2014-058026

(51) Int. Cl.
*G06F 9/455* (2006.01)

(52) U.S. Cl.
CPC .................... *G06F 9/45545* (2013.01); *G06F 2009/45595* (2013.01)

(58) Field of Classification Search
None
See application file for complete search history.

(56) References Cited

U.S. PATENT DOCUMENTS

| 6,088,727 | A | 7/2000 | Hosokawa et al. |
| 2002/0129085 | A1 | 9/2002 | Kubala et al. |
| 2008/0263390 | A1 | 10/2008 | Baba et al. |
| 2009/0288084 | A1* | 11/2009 | Astete ................. G06F 9/45533 718/1 |
| 2009/0300605 | A1* | 12/2009 | Edwards ............... G06F 9/5077 718/1 |
| 2010/0192152 | A1* | 7/2010 | Miyamoto .............. G06F 9/485 718/102 |
| 2011/0176551 | A1* | 7/2011 | Chawla ............... H04L 41/0213 370/395.31 |
| 2011/0239010 | A1* | 9/2011 | Jain ....................... G06F 1/3209 713/310 |
| 2014/0032761 | A1* | 1/2014 | Beveridge ............. G06F 9/5011 709/226 |
| 2016/0156538 | A1* | 6/2016 | Yalagandula ....... G06F 9/45533 709/224 |

FOREIGN PATENT DOCUMENTS

| JP | H10-187638 A | 7/1998 |
| JP | 2004-530196 A | 9/2004 |
| JP | 2008-269332 A | 11/2008 |
| JP | 5032191 B2 | 9/2012 |
| WO | 02/733397 A2 | 9/2002 |

* cited by examiner

*Primary Examiner* — Dong Kim
(74) *Attorney, Agent, or Firm* — Fujitsu Patent Center

(57) ABSTRACT

A network management device includes an information acquisition unit that receives a management packet from a virtual machine, the management packet containing management information that includes a combination of priority of applications operable on the virtual machine and information on communication bandwidth used for operation of the applications and a selection unit that selects an application to be stopped based on the management information and information on currently available communication bandwidth, and sends a reply packet containing information on the selected application to the virtual machine, in order for the virtual machine to stop the selected application.

10 Claims, 17 Drawing Sheets

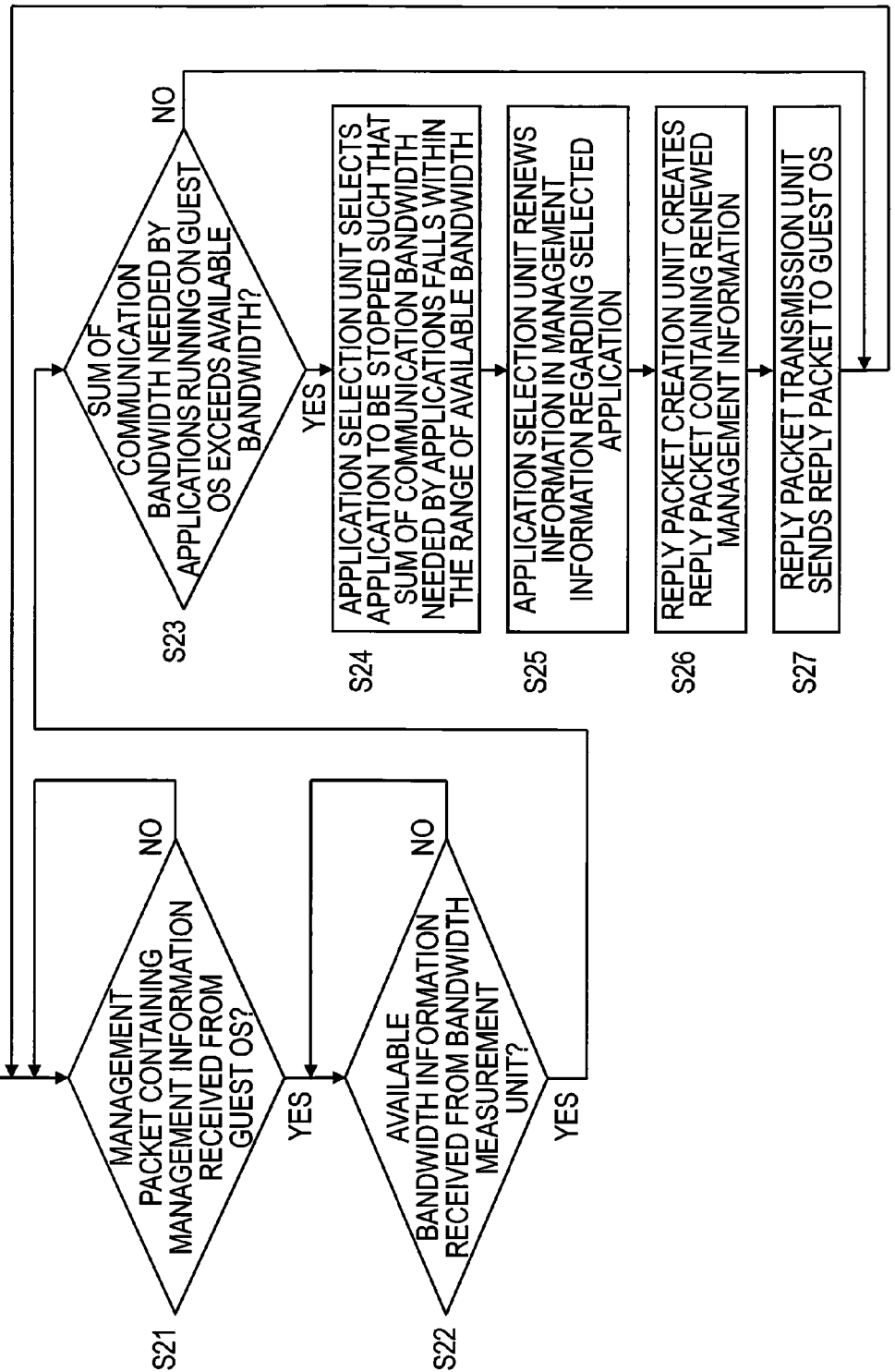

FIG. 11A

MANAGEMENT INFORMATION CREATED BY GUEST OS 31A (S12)

| APPLICATION NAME | PRIORITY | REQUISITE BANDWIDTH (MB) | CURRENT STATUS |
|---|---|---|---|
| APP1-1 | 1 | 1000 | Online |
| APP1-2 | 10 | 500 | Online |
| APP1-3 | 20 | 500 | Offline |

FIG. 11B

COMMUNICATION BANDWIDTH INFORMATION ACQUIRED BY HOST OS 21A (S22)

| NIC NAME | AVAILABLE BANDWIDTH (MB) |
|---|---|
| NIC22A | 0 |
| NIC23A | 1000 |

FIG. 11C

MANAGEMENT INFORMATION RENEWED BY HOST OS 21A (S25)

| APPLICATION NAME | PRIORITY | REQUISITE BANDWIDTH (MB) | CURRENT STATUS |
|---|---|---|---|
| APP1-1 | 1 | 1000 | Online |
| APP1-2 | 10 | 500 | To be offline |
| APP1-3 | 20 | 500 | Offline |

FIG. 13A

MANAGEMENT INFORMATION CREATED BY GUEST OS 31A (S12)

| APPLICATION NAME | PRIORITY | REQUISITE BANDWIDTH (MB) | CURRENT STATUS |
|---|---|---|---|
| APP1-1 | 1 | 1000 | Online |
| APP1-2 | 10 | 500 | Online |
| APP1-3 | 20 | 500 | Offline |

FIG. 13B

MANAGEMENT INFORMATION CREATED BY GUEST OS 31A (S12)

| APPLICATION NAME | PRIORITY | REQUISITE BANDWIDTH (MB) | CURRENT STATUS |
|---|---|---|---|
| APP3-1 | 5 | 1000 | Online |

FIG. 13C

COMMUNICATION BANDWIDTH INFORMATION ACQUIRED BY HOST OS 21A (S22)

| NIC NAME | AVAILABLE BANDWIDTH (MB) |
|---|---|
| NIC22A | 1000 |
| NIC23A | 1000 |

FIG. 13D

MANAGEMENT INFORMATION RENEWED BY HOST OS 21A (S25)

| APPLICATION NAME | PRIORITY | REQUISITE BANDWIDTH (MB) | CURRENT STATUS |
|---|---|---|---|
| APP1-1 | 1 | 1000 | Online |
| APP3-1 | 5 | 1000 | Online |
| APP1-2 | 10 | 500 | To be offline |
| APP1-3 | 20 | 500 | Offline |

FIG. 15A

MANAGEMENT INFORMATION CREATED BY GUEST OS 31A (S12)

| APPLICATION NAME | PRIORITY | REQUISITE BANDWIDTH (MB) | CURRENT STATUS | SWITCHING INFORMATION |
|---|---|---|---|---|
| APP1-1 | 1 | 1000 | Online | Fail over |
| APP1-2 | 10 | 500 | Online | Stop |
| APP1-3 | 20 | 500 | Offline | Stop |

FIG. 15B

COMMUNICATION BANDWIDTH INFORMATION ACQUIRED BY HOST OS 21A (S22)

| NIC NAME | AVAILABLE BANDWIDTH (MB) |
|---|---|
| NIC22A | 0 |
| NIC23A | 1000 |

FIG. 15C

MANAGEMENT INFORMATION RENEWED BY HOST OS 21A (S25)

| APPLICATION NAME | PRIORITY | REQUISITE BANDWIDTH (MB) | CURRENT STATUS | SWITCHING INFORMATION |
|---|---|---|---|---|
| APP1-1 | 1 | 1000 | Online | Fail over |
| APP1-2 | 10 | 500 | To be offline | Stop |
| APP1-3 | 20 | 500 | Offline | Stop |

FIG. 16A

MANAGEMENT INFORMATION CREATED BY GUEST OS 31A (S12)

| APPLICATION NAME | PRIORITY | REQUISITE BANDWIDTH (MB) | CURRENT STATUS | SWITCHING INFORMATION | BANDWIDTH SECUREMENT INFORMATION |
|---|---|---|---|---|---|
| APP1-1 | 1 | 1000 | Offline | Fail over | Yes |
| APP1-2 | 10 | 500 | Offline | Stop | No |
| APP1-3 | 20 | 500 | Online | Stop | No |

FIG. 16B

COMMUNICATION BANDWIDTH INFORMATION ACQUIRED BY HOST OS 21A (S22)

| NIC NAME | AVAILABLE BANDWIDTH (MB) |
|---|---|
| NIC22A | 0 |
| NIC23A | 1000 |

FIG. 16C

MANAGEMENT INFORMATION RENEWED BY HOST OS 21A (S25)

| APPLICATION NAME | PRIORITY | REQUISITE BANDWIDTH (MB) | CURRENT STATUS | SWITCHING INFORMATION | BANDWIDTH SECUREMENT INFORMATION |
|---|---|---|---|---|---|
| APP1-1 | 1 | 1000 | Offline | Fail over | Yes |
| APP1-2 | 10 | 500 | Offline | Stop | No |
| APP1-3 | 20 | 500 | To be offline | Stop | No |

FIG. 17A

MANAGEMENT INFORMATION CREATED BY GUEST OS 31A (S12)

| APPLICATION NAME | PRIORITY | REQUISITE BANDWIDTH (MB) | CURRENT STATUS | DORMANT PERIOD INFORMATION |
|---|---|---|---|---|
| APP1-1 | 1 | 1000 | Online | - |
| APP1-2 | 10 | 500 | Online | 06:00-24:00 |
| APP1-3 | 20 | 500 | Offline | - |

FIG. 17B

COMMUNICATION BANDWIDTH INFORMATION ACQUIRED BY HOST OS 21A (S22)

| NIC NAME | AVAILABLE BANDWIDTH (MB) |
|---|---|
| NIC22A | 0 |
| NIC23A | 1000 |

FIG. 17C

MANAGEMENT INFORMATION RENEWED BY HOST OS 21A (S25)

| APPLICATION NAME | PRIORITY | REQUISITE BANDWIDTH (MB) | CURRENT STATUS | DORMANT PERIOD INFORMATION |
|---|---|---|---|---|
| APP1-1 | 1 | 1000 | Online | - |
| APP1-2 | 10 | 500 | Online | 06:00-24:00 |
| APP1-3 | 20 | 500 | Offline | - |

NETWORK MANAGEMENT DEVICE, INFORMATION PROCESSING SYSTEM, AND PROGRAM

CROSS-REFERENCE TO RELATED APPLICATION

This application is based upon and claims the benefit of priority of the prior Japanese Patent Application No. 2014-058026, filed on Mar. 20, 2014, the entire contents of which are incorporated herein by reference.

FIELD

The present invention relates to a network management device, an information processing system, and a program.

BACKGROUND

With the performance improvement of physical machines (hereinafter also referred to as VM host), research into virtualization technology for consolidating a plurality of virtual machines to one physical machine is in progress in recent years. In the virtualization technology, for example, a virtualization software (hereinafter also referred to as hypervisor) allocates resources of a physical machine to a plurality of virtual machines, and services can be provided by application programs (hereinafter also referred to as application) installed in the virtual machines.

With such progress of virtualization technology, sometimes a virtual machine may execute a mission-critical task that was conventionally performed by a physical machine. Accordingly, the virtual environment of a virtual machine is now desired to have a level of reliability equal to that of the physical environment of a physical machine (see, for example, Japanese Patent No. 5032191, Japanese Translation of PCT Application No. 2004-530196, and Japanese Patent Application Laid-open No. 10-187638).

SUMMARY

In the event of a fallback due to a network failure or the like, for example, the physical machine stops applications with low Importance (priority). Thereby, adverse effects on applications of high importance can be prevented.

On the other hand, when a plurality of virtual machines in the same physical machine are used by various users, for example, it is common practice from a security point of view to adopt a configuration in which virtual machines are not allowed to communicate with the physical machine directly. For this reason, the virtual machines are not able to detect a change in the communication bandwidth caused by a physical network failure or the like that occurred in the physical machine. Therefore, unlike the physical machine, the virtual machines are not able to stop applications of low importance in accordance with a change in the communication bandwidth as noted above.

In the physical machine, migrations may be performed during operation of the system (provision of service). Migrations may be performed to the physical machine where virtual machines have already been created.

Also, since the virtual machines are not able to share the information on the physical machine for the security reasons noted above, when a new virtual machine is created in the same physical machine, the existing virtual machines are unable to recognize the new virtual machine created in the same physical machine. Therefore, with the virtual machines each executing their applications, the communication bandwidth may be compressed.

According to an aspect of the embodiments, a network management device includes: an information acquisition unit that receives a management packet from a virtual machine, the management packet containing management information that includes a combination of priority of applications operable on the virtual machine and information on communication bandwidth used for operation of the applications; and a selection that selects an application to be stopped based on the management information and information on currently available communication bandwidth, and sends a reply packet containing information on the selected application to the virtual machine, in order for the virtual machine to stop the selected application.

The object and advantages of the invention will be realized and attained by means of the elements and combinations particularly pointed out in the claims.

It is to be understood that both the foregoing general description and the following detailed description are exemplary and explanatory and are not restrictive of the Invention.

BRIEF DESCRIPTION OF DRAWINGS

FIG. 9 and FIG. 10 are flowcharts for explaining the details of the network management process in this embodiment.

FIGS. 11A to 11C are diagrams for explaining the management Information and bandwidth information in this embodiment.

FIGS. 13A to 13D are diagrams for explaining the management Information and bandwidth information in the second embodiment.

FIGS. 15A to 15C are diagrams for explaining the management information and bandwidth information in the third embodiment.

FIGS. 16A to 16C are diagrams for explaining the management information and bandwidth information in the fourth embodiment.

FIGS. 17A to 17C are diagrams for explaining the management information and bandwidth information in the fifth embodiment.

DESCRIPTION OF EMBODIMENTS

[Configuration of Information Processing System]

Figure 1:
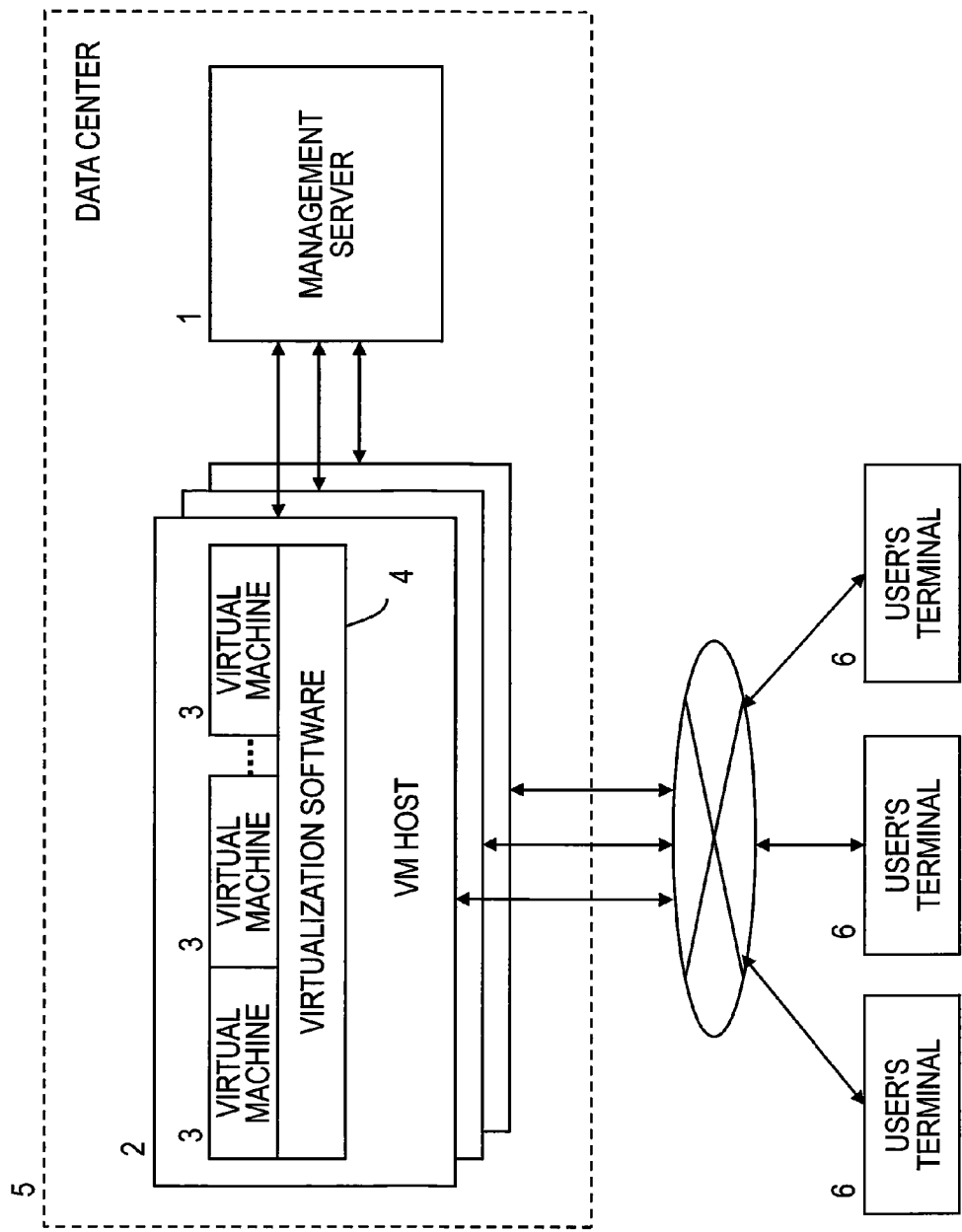
FIG. 1 is a diagram illustrating the overall configuration of an information processing system in one embodiment.

FIG. 1 is a diagram Illustrating the overall configuration of an information processing system in one embodiment. A management server 1 and a VM host 2 (hereinafter also referred to as network management device 2) are provided in a data center 5. Users' terminals 6 are connectable to the data center 5 via a network such as the Internet or Intranet.

The VM host 2 is configured by a plurality of physical machines in the example of FIG. 1, each physical machine having a CPU, a memory (DRAM), a large-capacity memory such as a hard disk (HDD) and the like, and a network. The resources of the VM host 2 are allocated to the plurality of virtual machines 3.

The management server 1 can communicate with the virtual machines 3 and manages the virtual machines 3 created in the VM host 2. The management server 1 may be created by a virtual machine, for example.

Virtual machines 3 provide their infrastructure to cloud users via a network (hereinafter also referred to as cloud service).

Cloud services are designed to provide a platform for building and running a computer system, i.e., the infrastructure itself of virtual machines 3, networks, and so on, via a network. Cloud users can access a cloud service portal site from a user's terminal 6, for example, and conclude an agreement on the use of the cloud regarding selected specifications needed by a certain virtual machine, such as CPU clock frequency, memory capacity (GB), hard disk capacity (MB/sec, IOPS), and communication bandwidth (Gbps) of the network. The user's terminal 6 allows for monitoring of the operating conditions of the virtual machines 3, or operation of the virtual machines, for example.

A virtualization software 4 is a platform software that runs virtual machines 3 by allocating the CPU, memory, hard disk, and network of the VM host 2 in accordance with instructions from the management server 1. The virtualization software 4 runs on the VM host 2, for example.

In addition to the allocated resources of the VM host 2, each virtual machine 3 includes image files including, for example, an OS, middleware, application, database, and so on, in its hard disk. The virtual machine 3 writes the image files into its memory from the hard disk when started up, for example, and performs an operation corresponding to a desired service. Hereinafter, the OS that runs on the VM host 2 will be called "host OS", and the OS that runs on the virtual machine 3 created in the VM host 2 will be called "guest OS".

Figure 2:
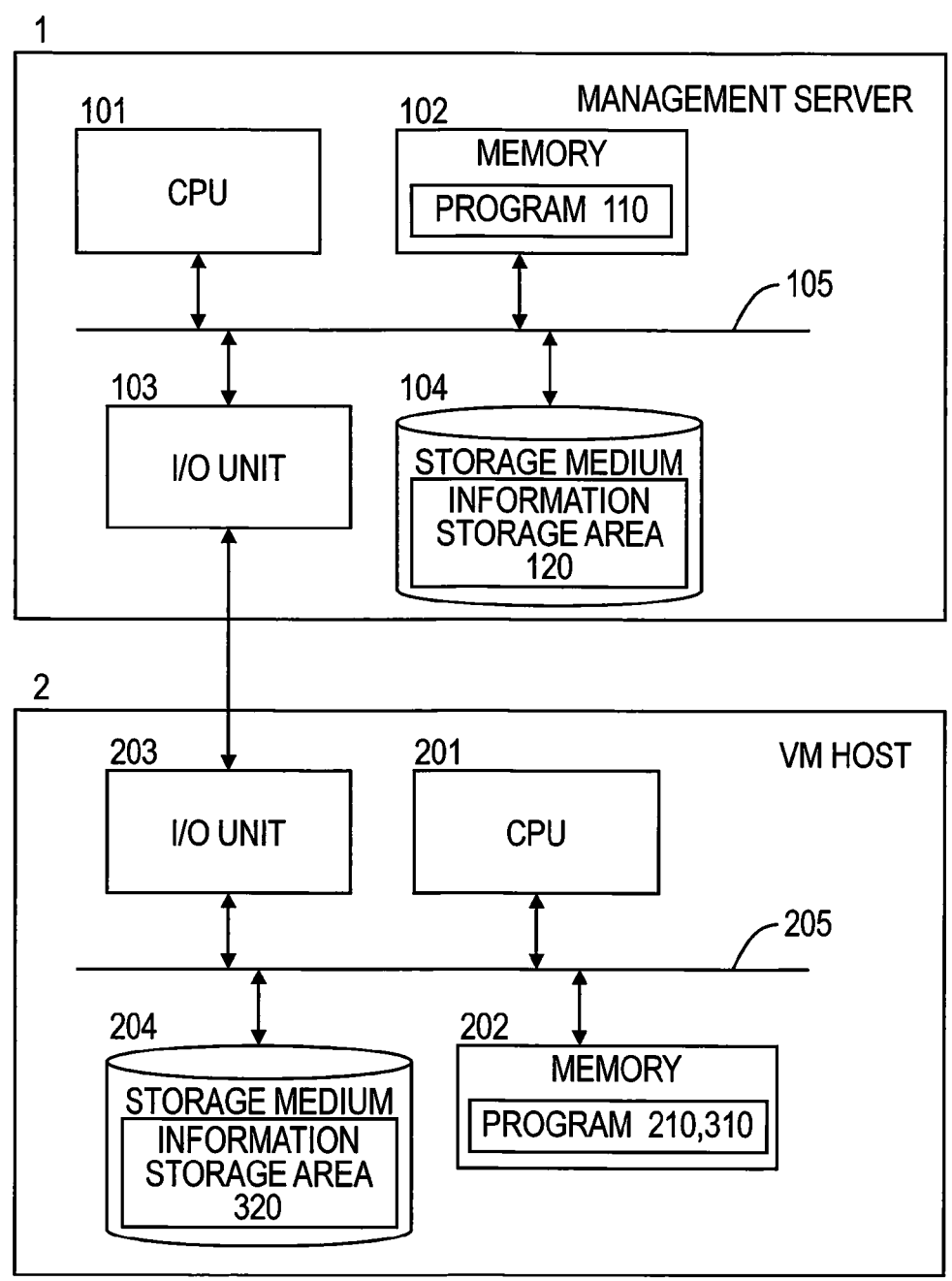
FIG. 2 is a diagram Illustrating the hardware configurations of the management server and VM host.

FIG. 2 is a diagram illustrating the hardware configurations of the management server and VM host. The management server 1 includes a CPU (processor) 101 that is a processor, a memory 102, an external Interface (I/O unit) 103, and a storage medium 104. These units are connected to each other via a bus 105. The storage medium 104 stores a program 110 for performing a startup process or the like of the virtual machines 3, for example, in a program storage area (not illustrated) in the storage medium 104. When executing the program 110, as depicted in FIG. 2, the CPU 101 loads the program 110 from the storage medium 104 into the memory 102, to perform the startup process or the like of the virtual machines 3 in cooperation with the program 110. The storage medium 104 includes an Information storage area 120 for storing information that is used, for example, when starting up the virtual machines 3.

The VM host 2 includes a CPU 201 that is a processor, a memory 202, an external interface (I/O unit) 203, and a storage medium 204. These units are connected to each other via a bus 205. The storage medium 204 stores a program 210 and a program 310 for performing a network management process, for example, in a program storage area (not illustrated) in the storage medium 204. When executing the program 210 or 310, as depicted in FIG. 2, the CPU 201 loads the program 210 or 310 from the storage medium 204 into the memory 202, to perform the network management process in cooperation with the program 210 or 310. The storage medium 204 includes an information storage area 320 for storing information that is used when performing the network management process.

Figure 3:
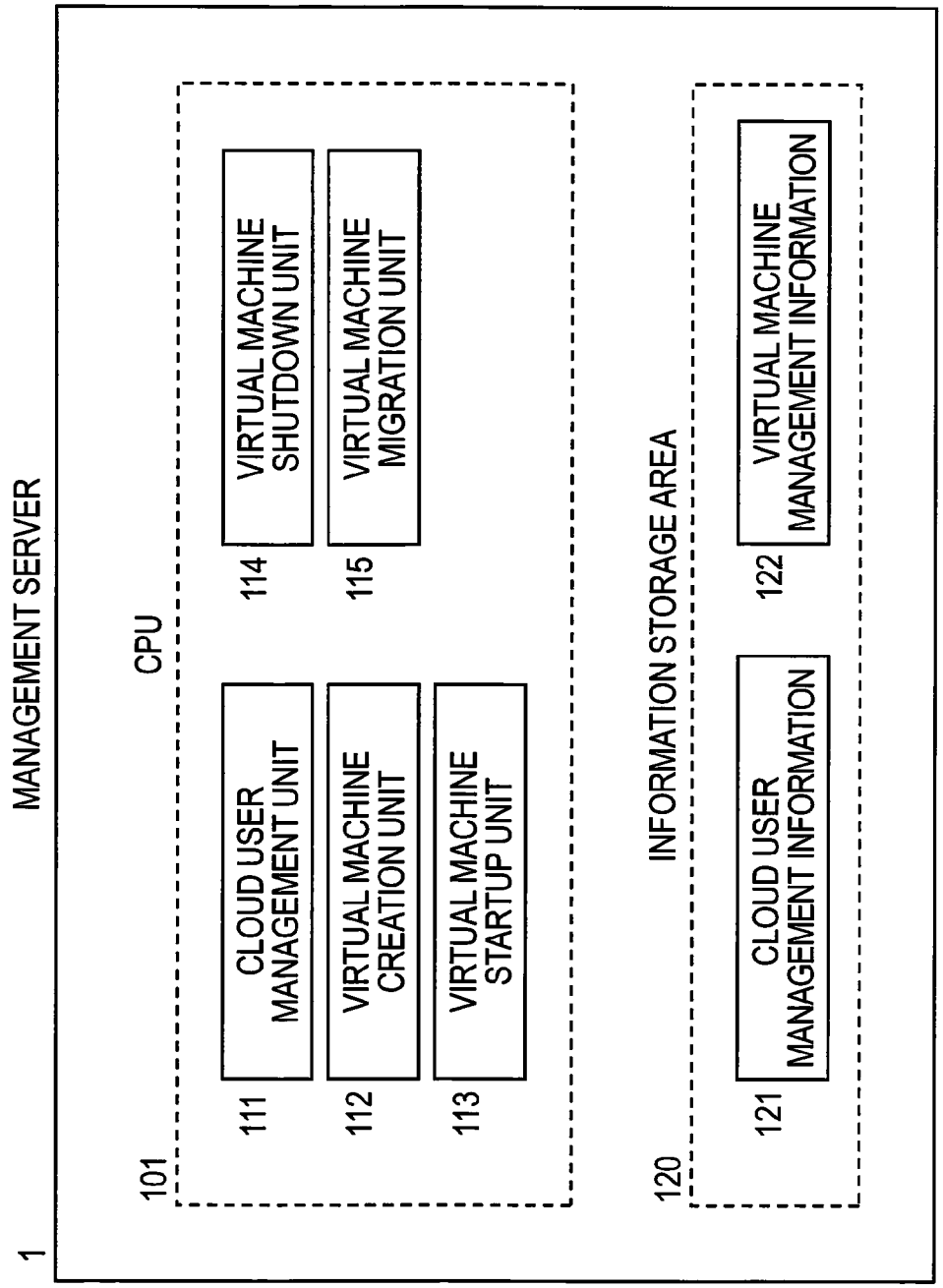
FIG. 3 is a functional block diagram of the management server depicted in FIG. 2.

FIG. 3 is a functional block diagram of the management server depicted in FIG. 2. By cooperating with the program 110, the CPU 101 operates, for example, as a cloud user management unit 111, a virtual machine creation unit 112, a virtual machine startup unit 113, a virtual machine shutdown unit 114, and a virtual machine migration unit 115. In the information storage area 120 is stored, for example, cloud user management information 121 and virtual machine management information 122.

The cloud user management unit 111 performs cloud user management such as, for example, a process of charging a cloud user who concluded an agreement on the use of the cloud. The virtual machine creation unit 112 creates a virtual machine 3 by allocating resources of the physical machine based on the cloud agreement, for example. The virtual machine startup unit 113 instructs the virtualization software 4 to start up the virtual machine 3, for example.

The virtual machine shutdown unit 114 instructs the virtualization software 4 to shut down a running virtual machine 3, for example. The virtual machine migration unit 115 instructs the virtualization software 4 to migrate a virtual machine 3, for example.

The cloud user management Information 121 is, for example, management information regarding the virtual machines 3, cloud users, and the agreement. The virtual machine management information 122 is, for example, management Information including operation information of the virtual machines 3 as reported from the virtualization software 4.

Figure 4:
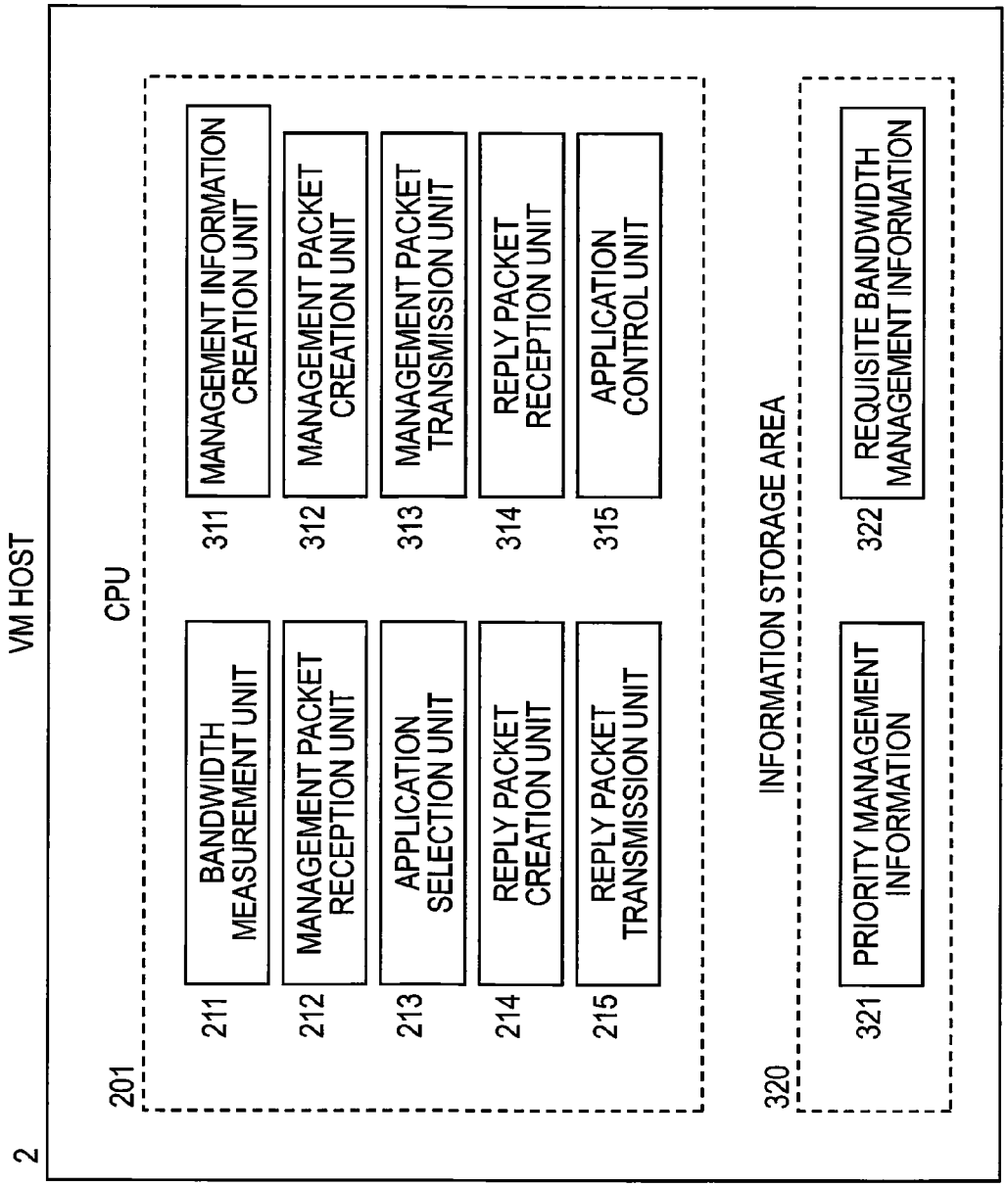
FIG. 4 is a functional block diagram of the VM host depicted in FIG. 2.

FIG. 4 is a functional block diagram of the VM host depicted in FIG. 2. By cooperating with the program 210, the CPU 201 operates, for example, as a bandwidth measurement unit 211, a management packet reception unit 212 (hereinafter also referred to as information acquisition unit 212), an application selection unit 213, a reply packet creation unit 214, and a reply packet transmission unit 215 (hereinafter, the application selection unit 213, reply packet creation unit 214, and reply packet transmission unit 215 will also be collectively referred to as selection unit). The bandwidth measurement unit 211, management packet reception unit 212, application selection unit 213, reply packet creation unit 214, and reply packet transmission unit 215 operate as functions of the host OS of the VM host 2. The program 210 may be, for example, a network driver that collectively controls the network cards (hereinafter also referred to as physical NIC) of the VM host 2.

The bandwidth measurement unit 211 acquires information on physical communication bandwidth currently available to applications running on the guest OS of the virtual machines 3, for example. The bandwidth measurement unit 211 may acquire information on the currently available communication bandwidth by acquiring information on the physical NICs of the VM host 2, for example.

The management packet reception unit 212 extracts a management packet (hereinafter also referred to as monitoring packet) from the packets sent from the guest OS, for example. The management packet reception unit 212 then acquires (extracts) management information from the received management packet. The management information is a combination of the priority of applications operable on the guest OS and the information on the communication bandwidth used for operation of the applications (bandwidth needed for running the applications). The details of this management information will be described later.

The application selection unit 213 selects an application running on the guest OS that has to be stopped, based on the management information received by the management packet reception unit 212 and the information on the currently available communication bandwidth that is determined by the bandwidth measurement unit 211. The reply packet creation unit 214 creates a reply packet containing information on the application selected by the application selection unit 213 so that the guest OS stops running the application selected by the application selection unit 213. The reply packet transmission unit 215 sends the reply packet created by the reply packet creation unit 214 to the guest OS.

By cooperating with the program 310, the CPU 201 (part of the CPU 201 allocated to the virtual machine 3 from the VM host 2) operates, for example, as a management information creation unit 311 (hereinafter also referred to as information creation unit 311), a management packet creation unit 312, a management packet transmission unit 313 (hereinafter also referred to as information transmission unit 313), a reply packet reception unit 314, and an application control unit 315 (hereinafter also referred to as control unit 315). The management information creation unit 311, management packet creation unit 312, management packet transmission unit 313, reply packet reception unit 314, and application control unit 315 operate as functions of the guest OS of the virtual machine 3. In the information storage area 320 is stored, for example, priority management information 321 and requisite bandwidth management information 322.

The management information creation unit 311 creates the management information mentioned above. The management information creation unit 311 may create management information at certain time intervals (e.g., every five minutes), for example. The management packet creation unit 312 creates the management packet mentioned above, and the management packet transmission unit 313 sends the management packet to the host OS. The management packet transmission unit 313 may send the management packet to the host OS, for example, in response to the management information creation unit 311 having created the management information. The reply packet reception unit 314 receives the reply packet sent from the host OS. The management information creation unit 311, management packet creation unit 312, management packet transmission unit 313, and reply packet reception unit 314 may be implemented, for example, by a monitoring agent that monitors a switch connected to the VM host 2.

The application control unit 315 stops the application selected by the host OS based on the management information in the reply packet received from the host OS. The application control unit 315 may be one that configures a cluster system, with the guest OS running the application to be stopped and guest OSs in other VM hosts that have the same application as the stopped application. In this case, the application control unit 315 starts up the application on other guest OSs corresponding to the application that is selected by the host OS to be stopped when stopping that application.

This cluster system is formed by a plurality of computers connected together and behaves as if they are one computer as a whole to service users or other computers. For instance, the same application is installed in a plurality of virtual machines, and when a failure occurs in a virtual machine of a normal system, the application is automatically switched to one of the virtual machines of a standby system. Thereby, the service user (cloud user) can continuously use the service without being affected by the failure that occurred in the virtual machine of the normal system. Therefore, to configure such a cluster system, for example, the application control unit 315 in this embodiment may run on each of the guest OSs that form the cluster system. The application control units may exchange information between the guest OSs via lines that connect the respective VM hosts. Also, the application control units 315 may monitor the operating conditions of each other's guest OSs forming the cluster system and the applications running on each other's guest OSs. Also, the application control units 315 may automatically switch an application from another guest OS to one on which it is installed if a failure is detected in other guest OSs or applications running on other guest OSs.

The priority management information 321 is management information regarding the degree of importance (priority) of applications that run on a guest OS. The priority management information 321 may be one that ranks the priority of applications running on the virtual machine 3 in the VM host 2, for example, for every VM host 2. Also, the priority management information 321 may be one that includes the priority of all the applications that the cloud user uses, for example, irrespective of whether the applications run on the same VM host 2, for every cloud user. The cloud user may, for example, store the ranking of priority of applications the user may possibly use as the priority management information 321 in advance. Thereby, the application selection unit 213 can quickly rank the priority of applications by referring to the priority management information 321 even after a migration or when a new guest OS is created.

The requisite bandwidth management Information 322 is management Information regarding the communication bandwidth needed for running each application. The cloud user may, for example, store the Information on the communication bandwidth needed for running applications that the user may possibly use as the requisite bandwidth management information 322 in advance.

[Relationship Between VM Host and Virtual Machine]

Figure 5:
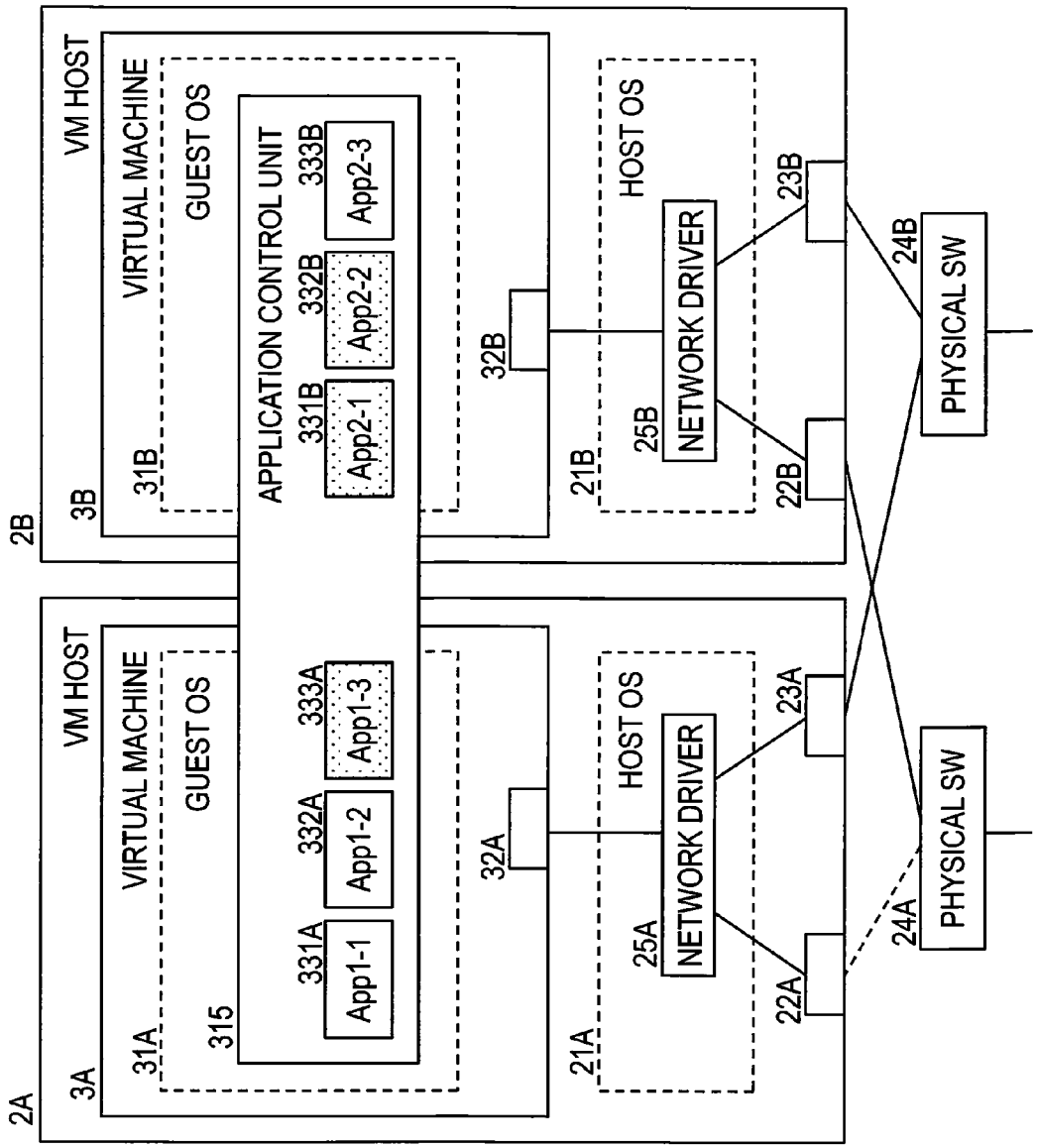
FIG. 5 and FIG. 6 are diagrams that explain common VM hosts and virtual machines.
Figure 6:
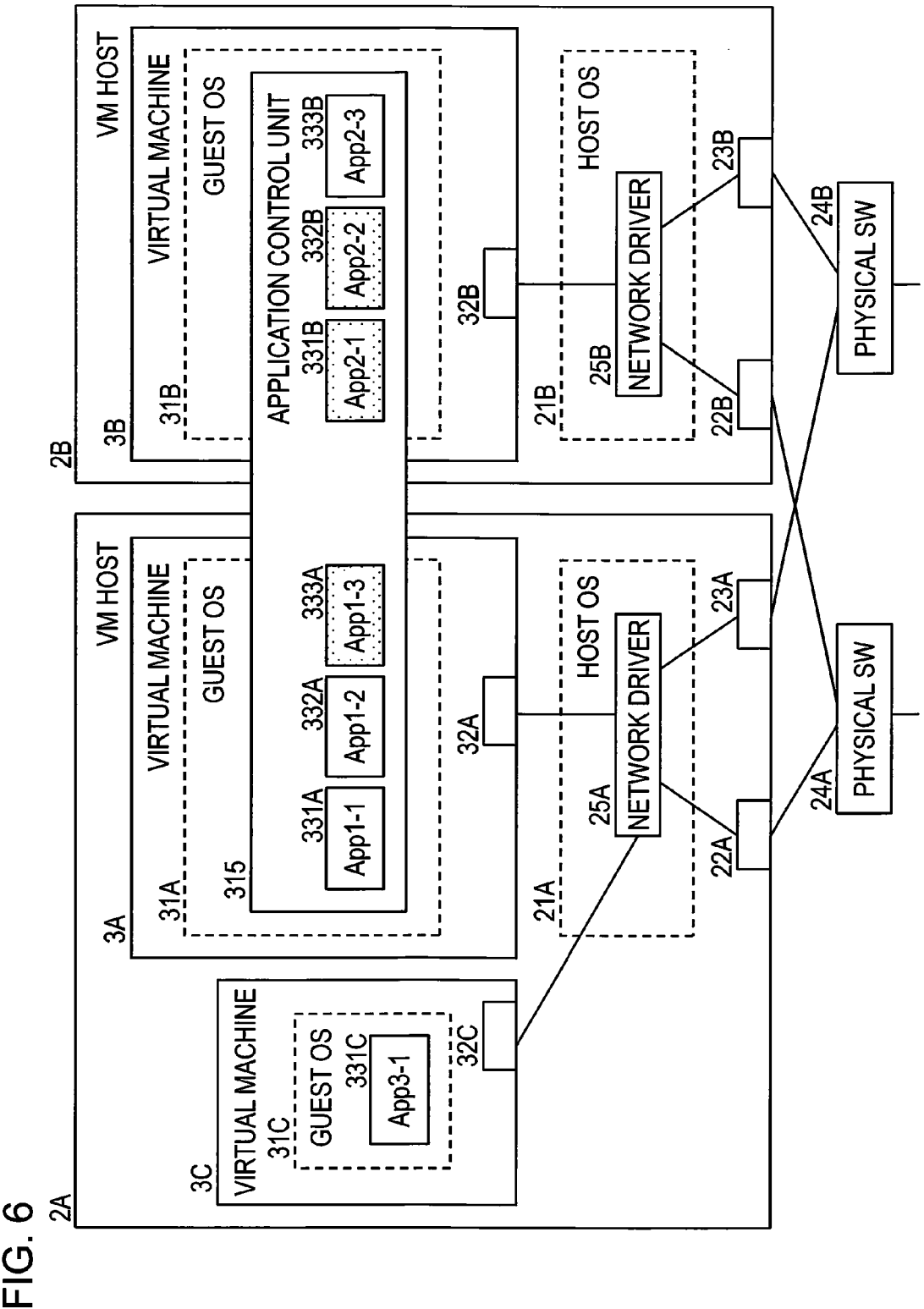

Next, the relationship between the VM host and virtual machine will be explained. FIG. 5 and FIG. 6 are diagrams that explain common VM hosts and virtual machines.

In the example of FIG. 5, a virtual machine 3A is created in a VM host 2A. A virtual NIC 32A of the virtual machine 3A is virtually connected to a physical NIC 22A and a physical NIC 23A of the VM host 2A via a network driver 25A in the host OS 21A. In the example of FIG. 5, a virtual machine 3B is created in a VM host 2B. A virtual NIC 32B of the virtual machine 3B is virtually connected to a physical NIC 22B and a physical NIC 23B of the VM host 2B via a network driver 25B in the host OS 21B. The physical NIC 22A and physical NIC 22B are connected to a physical switch (physical SW) 24A, while the physical NIC 23A and physical NIC 23B are connected to a physical switch (physical SW) 24B. The VM host 2A and VM host 2B have the host OS 21A and host OS 21B, respectively, while the virtual machine 3A and virtual machine 3B have the guest OS 31A and guest OS 31B, respectively.

Same applications are installed in both of the guest OS 31A and guest OS 31B. More specifically, in the example of FIG. 5, APP 331A, APP 332A, and APP 333A (hereinafter also referred to as APP1-1, APP1-2, and APP1-3, respectively) are installed in the guest OS 31A. In the guest OS 31B, APP 331B, APP 332B, and APP 333B, which are the same applications as APP1-1, APP1-2, and APP1-3 (hereinafter also referred to as APP2-1, APP2-2, and APP2-3, respectively) are Installed.

The guest OS 31A and guest OS 31B configure a cluster system, for example, by the application control unit 315 mentioned above. In the example of FIG. 5, APP1-1 and APP1-2 are running on the guest OS 31A, while APP2-3 is running on the guest OS 31B (applications with dot hatching in FIG. 5 are stopped).

In the example of FIG. 5, if, for example, a failure occurs whereby the communication line between the physical NIC 22A of the VM host 2A and the physical switch 24A is disabled, the VM host 2A then can communicate with external devices only via the communication line between the physical NIC 23A and the physical switch 24B. In this case, the communication line between the physical NIC 23A and the physical switch 24B alone may be unable to provide the communication bandwidth needed for APP1-1 and APP 1-2 to operate. Therefore, an application with lower priority (e.g., APP1-2) is switched from the guest OS31A to the guest OS 31B to run thereon, so as to secure communication bandwidth needed for an application with high priority (e.g., APP1-1) to operate.

However, if a configuration is adopted from a security point of view wherein the virtual machine 3A is not allowed to communicate with the VM host 2A directly, the guest OS 31A is unable to detect a failure that occurred in the communication line of the VM host 2A, and therefore unable to switch over the application. For this reason, the guest OS 31A may sometimes be unable to secure the communication bandwidth needed for continuing the operation of the high priority application.

FIG. 6, on the other hand, is a diagram depicting a case where a new virtual machine is created in the VM host 2A by migration or the like.

In the example of FIG. 6, a virtual NIC 32C of the newly created virtual machine 3C is virtually connected to the physical NIC 22A and physical NIC 23A of the VM host 2A via the network driver 25A. Namely, in the example of FIG. 6, the virtual machine 3A and virtual machine 3C share the same communication line. Therefore, depending on the operating condition of an application APP 331C in the guest OS 31C (hereinafter also referred to as APP3-1), there may be a shortage of communication bandwidth for a high priority application running on the guest OS 31A to use. Accordingly, the guest OS 31A need to secure the communication bandwidth needed for the high priority application (e.g., APP1-1) to operate, for example, by switching the low priority application (e.g., APP1-2) to the guest OS 31B.

However, in the example of FIG. 6, too, if a configuration is adopted from a security point of view wherein the virtual machine 3A is not allowed to communicate with the VM host 2A directly, the guest OS 31A is unable to acquire information on the newly created virtual machine 3C. For this reason, the guest OS 31A is not able to recognize the new virtual machine 3C created in the same VM host 2A. Accordingly, the virtual machine 3A may sometimes be unable to secure communication bandwidth needed for the high priority application to run, because of the guest OS 31A and guest OS 31C each executing their applications.

Therefore, in this embodiment, the host OS 21A of the VM host 2A selects an application to be stopped based on the priority and requisite bandwidth of the applications on the guest OS 31A, and information on currently available bandwidth, and causes the guest OS 31A to stop the application, in order to secure the communication bandwidth to be used by the application of high importance.

[First Embodiment]

Figure 7:
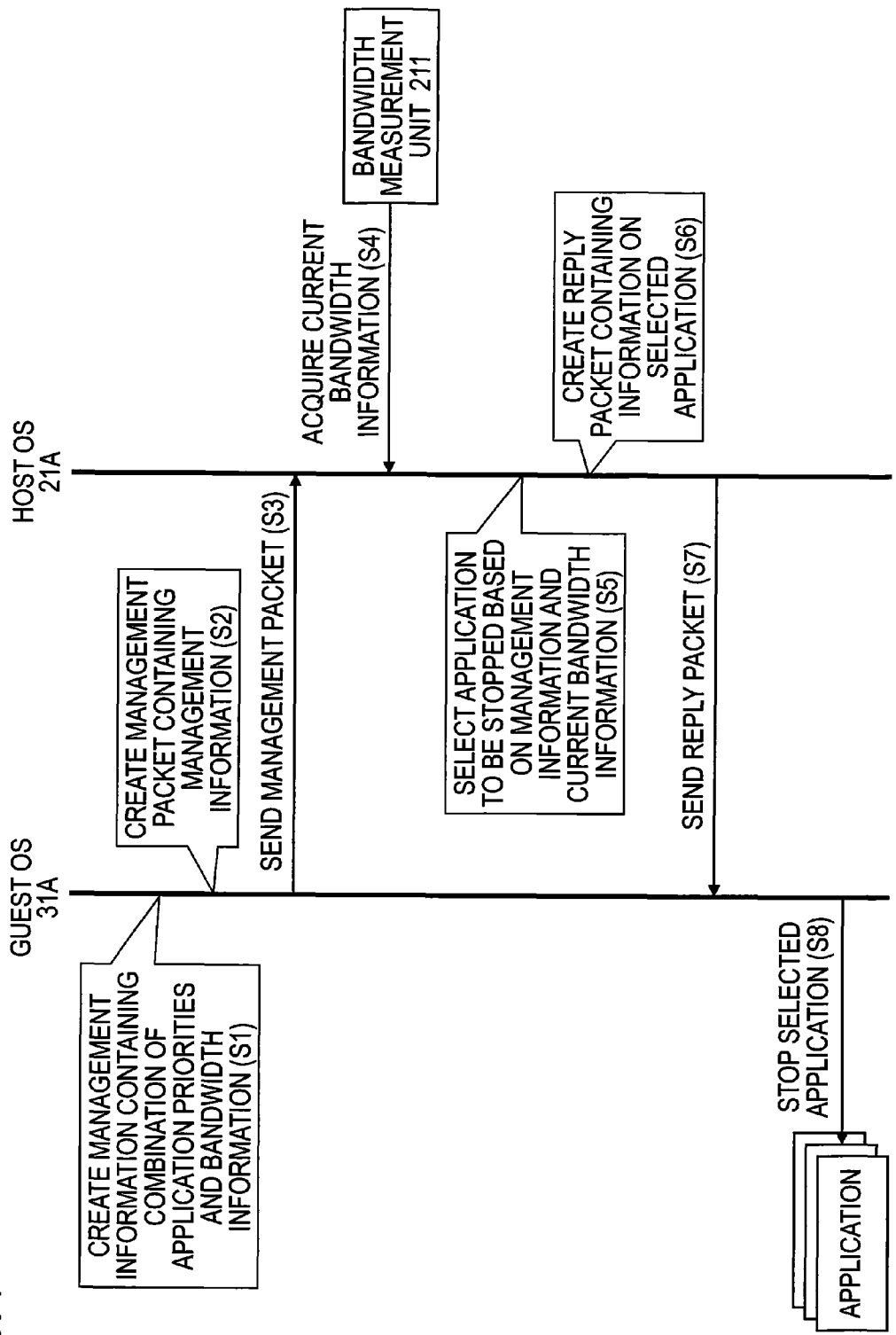
FIG. 7 is a sequence chart for explaining the overall network management process in this embodiment.
Figure 8:
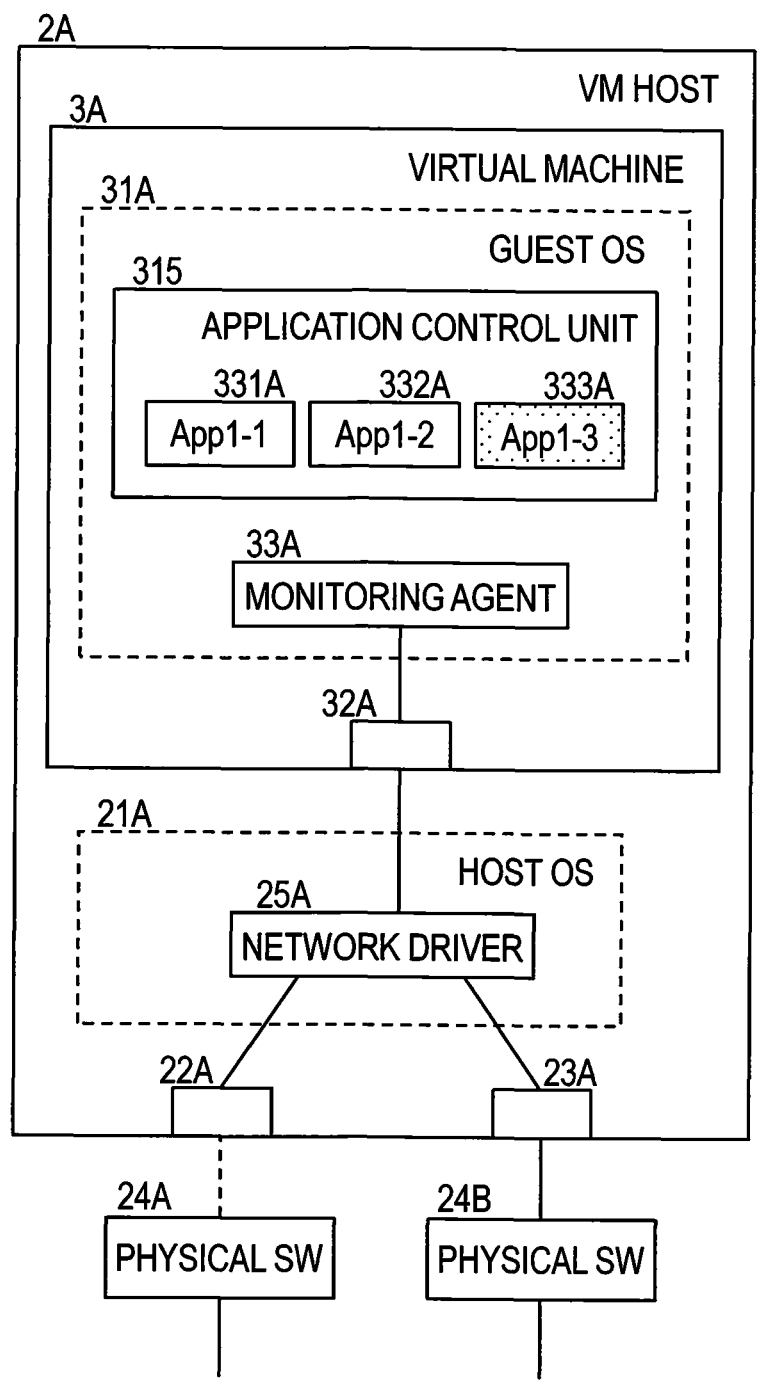
FIG. 8 is a diagram for explaining the overall network management process in this embodiment.

First, a first embodiment will be described. FIG. 7 is a sequence chart for explaining the overall network management process in this embodiment. FIG. 8 is a diagram for explaining the overall network management process in this embodiment. The overall network management process of FIG. 7 will be described with reference to FIG. 8. In the case to be described with reference to FIG. 8, the guest OS 31A does not configure a duster system with other guest OSs.

[S1 to S3 in FIG. 7]

First, the guest OS 31A of the virtual machine 3A creates management information that is a combination of the priority of applications and the information on the communication bandwidth needed for operation of the respective applications (S1).

FIG. 8 is a diagram that explains the relationship between the VM host 2A and the virtual machine 3A. In FIG. 8, the virtual machine 3A is created in the VM host 2A. FIG. 8 depicts applications (APP1-1, APP1-2, and APP1-3) on the guest OS 31A of the virtual machine 3A, and an application control unit 315 that controls, i.e., starts up or stops, the applications. A virtual NIC 32A of the virtual machine 3A is virtually connected to a physical NIC 22A and a physical NIC 23A of the VM host 2A via a network driver 25A. In the example of FIG. 8, unlike the example described with reference to FIG. 5, the guest OS 31A includes a monitoring agent 33A.

The monitoring agent 33A is a program that runs on the guest OS 31A, for example, and monitors the operating condition of physical switches or the like connected to the VM host 2A. The monitoring agent 33A in the example of FIG. 8 sends a monitoring packet to the physical switch 24A and physical switch 24B connected to the VM host 2A, for example, and determines the status of each physical switch based on presence or absence of a reply. In the example to be described with reference to FIG. 7 and FIG. 8, the monitoring agent 33A of the guest OS 31A creates management Information.

The management information is a combination of the priority of applications operable on the guest OS 31A and the information on the communication bandwidth needed for operation of these applications. This management information is created by the monitoring agent 33A, for example, by combining Information regarding the priority of applications stored in the priority management information 321, and the information regarding the communication bandwidth needed for operation of the respective applications stored in the requisite bandwidth management information 322.

Referring back to FIG. 7, the guest OS 31A creates a management packet containing management information (S2), and sends it to the host OS 21A (S3). This management packet may be created and sent by the monitoring agent 33A mentioned above.

[S4 to S7 In FIG. 7]

When the host OS 21A of the VM host 2A receives the management packet from the guest OS 31A, for example, the host OS 21A acquires information on the currently available communication bandwidth (S4), and selects an application that has to be stopped, based on the management information contained in the management packet and the information on the currently available communication bandwidth (S5).

Namely, in the example of FIG. 8, if the communication line between the physical NIC 22A and physical switch 24A is disabled, the VM host 2A can then communicate with external devices only via the communication line between the physical NIC 23A and the physical switch 24B. In this case, the communication bandwidth that can be used by the applications running on the guest OS 31A may be reduced. Therefore, the host OS 21A of the VM host 2A selects a low priority application running on the guest OS 31A, based on the management information received from the guest OS 31A and the information on the communication bandwidth currently available to the VM host 2A, and causes the guest OS 31A to stop that application. This permits applications with high priority running on the guest OS 31A to keep running.

In the example to be described with reference to FIG. 7, the network driver 25A in the host OS 21A selects an application to be stopped by the guest OS 31A. The network driver 25A may be one that specifies the management packet sent from the guest OS 31A by checking the header of the packet, for example.

In the example of FIG. 7, the communication bandwidth currently available to the VM host 2A may be measured by the bandwidth measurement unit 211, for example, which is part of the network driver 25A (S4). The network driver 25A may also be one that constantly measures the currently available communication bandwidth by the bandwidth measurement unit 211. The network driver 25A selects an application to be stopped, out of applications currently running on the guest OS 31A, based on the management information and the information on the currently available communication bandwidth (S5), for example. More specifically, the network driver 25A sequentially and preferentially selects lower priority applications, in accordance with the priority contained in the management information, as applications to be stopped. The network driver 25A selects applications to be stopped until the sum of communication bandwidth needed for the applications to keep running falls within the range of (becomes lower than) the currently available communication bandwidth. The selection of applications to be stopped will be described in detail later.

Next, the host OS 21A creates a reply packet containing information on selected applications and sends the created reply packet to the guest OS 31A (S6, S7).

When a plurality of virtual machines 3A in the same VM host 2A are used by various users, in some cases, direct communication between the VM host 2A and virtual machines 3A is not allowed for security reasons. In such a case, too, the virtual machines 3A may need to communicate with the VM host 2A when checking the operating conditions of physical switches connected to the VM host 2A. Therefore, the host OS21A in this embodiment makes use of this limited communication means between the VM host 2A and virtual machines 3A to send the guest OS 31A the information on the communication bandwidth that can be used for the applications on the guest OS 31A.

[S8 in FIG. 7]

After receiving the reply packet from the host OS 21A, the guest OS 31A stops the applications selected by the host OS 21A (S8). In the example of FIG. 8, the monitoring agent 33A that received the reply packet from the guest OS 31A reports the Information on the selected applications contained in the reply packet to the application control unit 315. The application control unit 315 then stops the selected applications.

According to this embodiment, as described above, the host OS 21A of the VM host 2A receives a management packet containing management Information, which is a combination of the priority of applications operable on the guest OS 31A of the virtual machine 3A and the information on the communication bandwidth used for operation of the applications, from the guest OS 31A. Next, the host OS 21A selects an application that has to be stopped, based on the management Information and the information on the currently available communication bandwidth received from the guest OS 31A. The host OS 21A then sends a reply packet containing information on selected applications to the guest OS 31A and causes the guest OS 31A to stop the selected applications. This way, the guest OS 31A can detect a failure that occurred in a communication line of the VM host 2A or the periphery thereof. Accordingly, the guest OS 31A can secure communication bandwidth for allowing applications of high importance to operate continuously by stopping applications of low importance in response to the occurrence of a failure.

According to this embodiment, the guest OS 31A can detect a failure that occurred in a communication line of the VM host 2A or the periphery thereof only by communication between the guest OS 31A and host OS 21A. Therefore, the guest OS 31A, for example, need not be controlled by the management server 1. Accordingly, the guest OS 31A can secure communication bandwidth for allowing applications of high importance to operate continuously even when the communication line between the VM host 2A and management server 1 is disabled due to a failure or the like.

[Details of First Embodiment]

Figure 9:
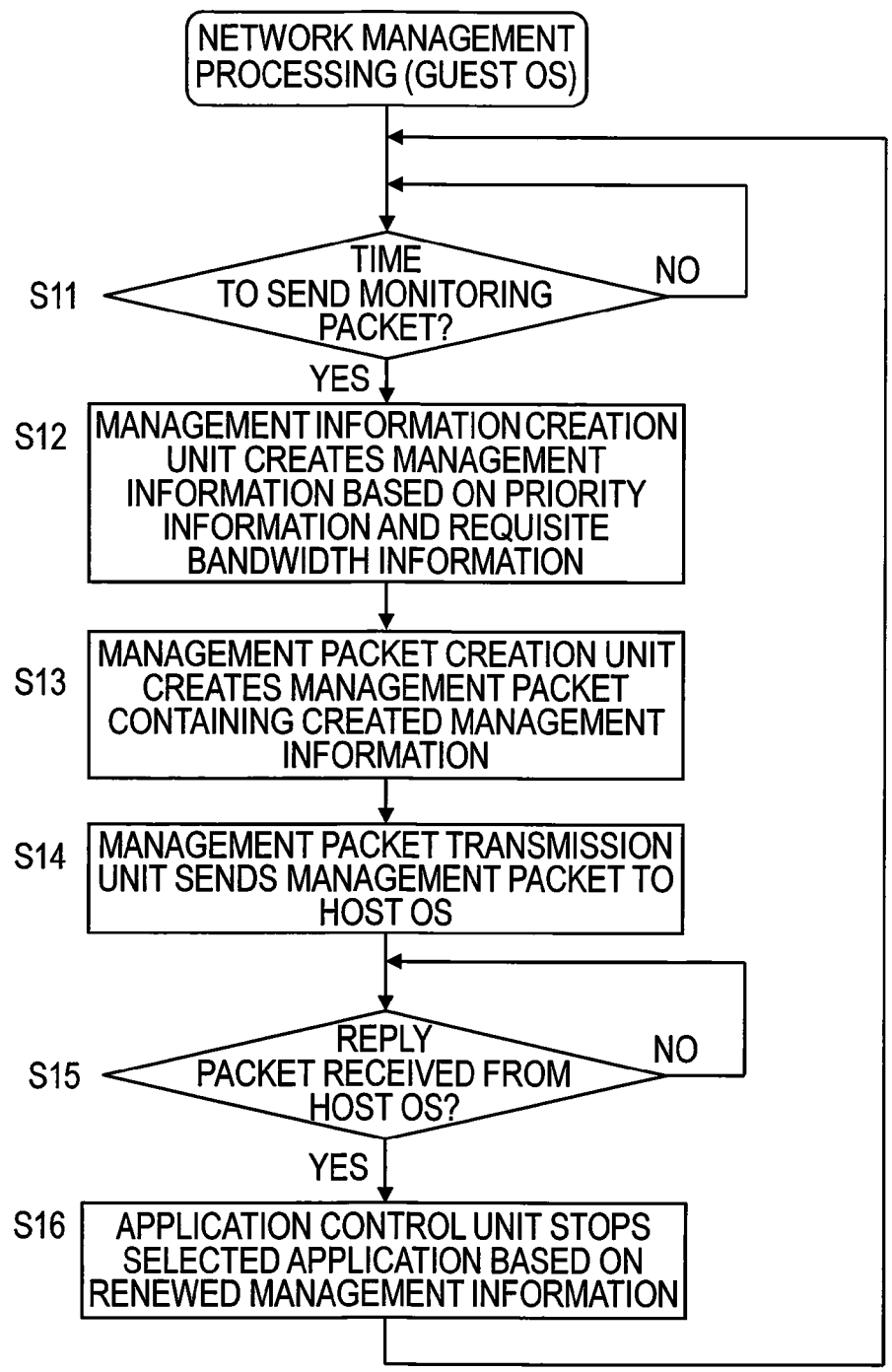

Next, the first embodiment will be described in detail. FIG. 9 and FIG. 10 are flowcharts for explaining the details of the network management process in this embodiment. FIGS. 11A to 11C are diagrams for explaining the management information and bandwidth information in this embodiment. The network management process of FIG. 9 and FIG. 10 will be described in detail with reference to FIG. 8 and FIGS. 11A to 11C.

[Processing in Virtual Machine (Guest OS)]

First, the processing executed in the virtual machine 3A will be described. FIG. 9 is a flowchart of the network management process executed in the guest OS 31A of the virtual machine 3A.

The management Information creation unit 311 of the guest OS 31A performs standby until it is time to send a monitoring packet (NO at S11). Then, the management information creation unit 311 creates management Information based on the priority of each application and the information on the communication bandwidth needed for operation of each application (S12) when, for example, it is time to send a monitoring packet (YES at S11). The management packet creation unit 312 of the guest OS 31A creates the management packet containing the created management information (S13), and the management packet transmission unit 313 of the guest OS 31A sends the management packet to the host OS 21A (S14). The management information and management packet will not be described in detail here, as they were explained with reference to FIG. 7. The management information creation unit 311 may create management information when, for example, instructed by the management server 1.

Next, the reply packet reception unit 314 of the guest OS 31A performs standby until the reply packet reception unit 314 receives a reply packet from the host OS 21A (NO at S15). Then, when the reply packet reception unit 314 receives a reply packet from the host OS 21A (YES at S15), the application control unit 315 stops the selected applications (S16) based on the management information contained in the reply packet (management information renewed by the host OS 21A). The guest OS 31A then stands by until it is time to send a next monitoring packet, for example.

[Processing in VM Host (Host OS)]

Next, the processing executed in the VM host 2A will be described. FIG. 10 is a flowchart of the network management process executed in the host OS 21A of the VM host 2A.

In the example of FIG. 10, the application selection unit 213 of the host OS 21A performs standby until the application selection unit 213 receives a management packet containing management information from the guest OS 31A via the management packet reception unit 212 of the host OS 21A (NO at S21). Then, when the application selection unit 213 receives a management packet containing management Information from the guest OS 31A (YES at S21), the application selection unit 213 performs standby until the application selection unit 213 acquires information on the bandwidth currently available to the VM host 2A, which is, for example, measured by the bandwidth measurement unit 211 of the host OS 21A (NO at S22). Then, when the application selection unit 213 acquires information on the bandwidth currently available to the VM host 2A (YES at S22), for example, it determines whether or not to select applications of the guest OS 31A to be stopped (S23). More specifically, the application selection unit 213 selects applications to be stopped (S24) if the sum of communication bandwidth needed by the applications running on the guest OS 31A exceeds the communication bandwidth currently available to the VM host 2A (YES at S23), for example.

The communication line for the VM host 2A to communicate with external devices may be partly disabled due to a failure. In such a case, the communication bandwidth that was sufficient for the operations running on the guest OS 31A to operate may fall short upon occurrence of a failure. Therefore, the application selection unit 213 periodically compares the sum of communication bandwidth needed by the applications running on the guest OS 31A and currently available communication bandwidth, based on the management Information of the applications running on the guest OS 31A and the information on the currently available communication bandwidth. Thereby, the application selection unit 213 is able to stop low priority applications when the sum of communication bandwidth needed by the applications running on the guest OS 31A exceeds the currently available communication bandwidth. The guest OS 31A therefore can carry on operation of the high priority applications. Now, specific examples of selection of applications to be stopped will be described below.

[Specific Example of Selection of Applications to be Stopped (1)]

FIGS. 11A to 11C are diagrams for explaining the management information and information on the currently available bandwidth in the case depicted in FIG. 8. First, the management information created by the guest OS 31A will be described. It shall be understood that, in the example described below, the applications running on the guest OS 31A use all the communication bandwidth currently available to the VM host 2A.

In the example of FIG. 8, the management information creation unit 311 of the guest OS 31A creates management Information of APP1-1 to APP1-3 that are applications operable on the guest OS 31A (S12). More specifically, the management information creation unit 311 acquires information on the priority of APP1-1 to APP1-3, and information on the bandwidth needed for APP1-1 to APP1-3 to operate, from the priority management information 321 and requisite bandwidth management information 322. The management Information creation unit 311 then creates management Information by combining the acquired priority information and the information needed for operation of the applications.

FIG. 11A illustrates a specific example of management information created by the guest OS 31A. In FIG. 11A, APP1-1 has a priority of "1" and a requisite bandwidth of "1000 (MB)". APP1-2 has a priority of "10" and a requisite bandwidth of "500 (MB)". APP1-3 has a priority of "20" and a requisite bandwidth of "500 (MB)".

The management information in FIG. 11A also includes the current status of each application. More specifically, in the example of FIG. 11A, the current status of APP1-1 and APP1-2 is "online", which means they are operating. The current status of APP1-3 is "offline", which means it is stopped. Therefore, in the example of FIG. 11A, the communication bandwidth needed by the applications currently running on the guest OS 31A is "1500 (MB)", which is the sum of "1000 (MB)" used by APP1-1 and "500 (MB)" used by APP1-2.

Next, the information on currently available communication bandwidth will be explained. FIG. 11B illustrates a specific example of information on communication bandwidth acquired by the host OS 21A.

In FIG. 11B, the bandwidth available to the physical NIC 22A is "0 (MB)", while the bandwidth available to the physical NIC 23A is "1000 (MB)". Namely, the communication bandwidth currently available to the applications running on the guest OS 31A is "1000 (MB)", which is the sum of "1000 (MB)" for the physical NIC 22A and "0 (MB)" for the physical NIC 23A.

Here, as is seen from FIG. 11A, the communication bandwidth needed by the applications running on the guest OS 31A Is "1500 (MB)". On the other hand, as is seen from FIG. 11B, the communication bandwidth currently available to the applications running on the guest OS 31A is "1000 (MB)". Therefore, the communication bandwidth needed by the applications running on the guest OS 31A exceeds the communication bandwidth currently available to the applications running on the guest OS 31A (S23). That is, in the example of FIGS. 11A and 11B, the applications running on the guest OS 31A are currently not being able to use the communication bandwidth needed for them to operate. Accordingly, the application selection unit 213 selects applications to be stopped (S24) so that the communication bandwidth needed by the applications running on the guest OS 31A falls within the range of the currently available communication bandwidth.

Next, selection by the host OS 21A of applications to be stopped will be explained. FIG. 11C Illustrates a specific example of management information renewed by the host OS 21A.

In the example of FIG. 11A and FIG. 11B, the communication bandwidth needed by the applications running on the guest OS 31A exceeds the communication bandwidth currently available to the applications running on the guest OS 31A by "500 (MB)". Therefore, the application selection unit 213 selects an application that uses communication bandwidth of "500 (MB)" as the application to be stopped.

Here, the application selection unit 213 preferentially selects an application with low priority, for example, as the application to be stopped. In the example of FIG. 11C, the applications currently running on the guest OS 31A are APP1-1 and APP1-2, according to the status indicated in FIG. 11C. APP1-1 has a priority of "1", while APP1-2 has a priority of "10". Therefore, the application selection unit 213 first selects APP1-2, which is a low priority application, as the application to be stopped (S24). In the example of FIG. 11C, APP1-2 needs a bandwidth of "500 (MB)" to operate. Therefore, the application selection unit 213 is able to control the communication bandwidth needed by the applications running on the guest OS 31A to fall within the range of currently available communication bandwidth, by stopping the operation of APP1-2. Thus, the application selection unit 213 stops the operation of APP1-2 and ends selection of application to be stopped.

Applications to be stopped need not always be selected sequentially from lower priority applications. That is, the application selection unit 213 may select applications to be stopped on the basis of the priority of applications to which a value proportional to the communication bandwidth used by each application is added as a weight.

Referring back to FIG. 10, the application selection unit 213 renews the information in the management information regarding the selected applications (S25). In the example of FIG. 11C, the application selection unit 213 renews the current status of APP1-2, which is the selected application, from "online" to "to be offline". The reply packet creation unit 214 then creates a reply packet containing the renewed management information (S26), and the reply packet transmission unit 215 sends the reply packet created by the reply packet creation unit 214 to the guest OS 31A (S27). This allows the guest OS 31A to recognize an application to be stopped by extracting an application whose current status is "to be offline" from the management information, and to stop the application. Accordingly, the guest OS 31A can keep on running applications with high priority, among the applications running on the guest OS 31A.

[Second Embodiment]

Figure 12:
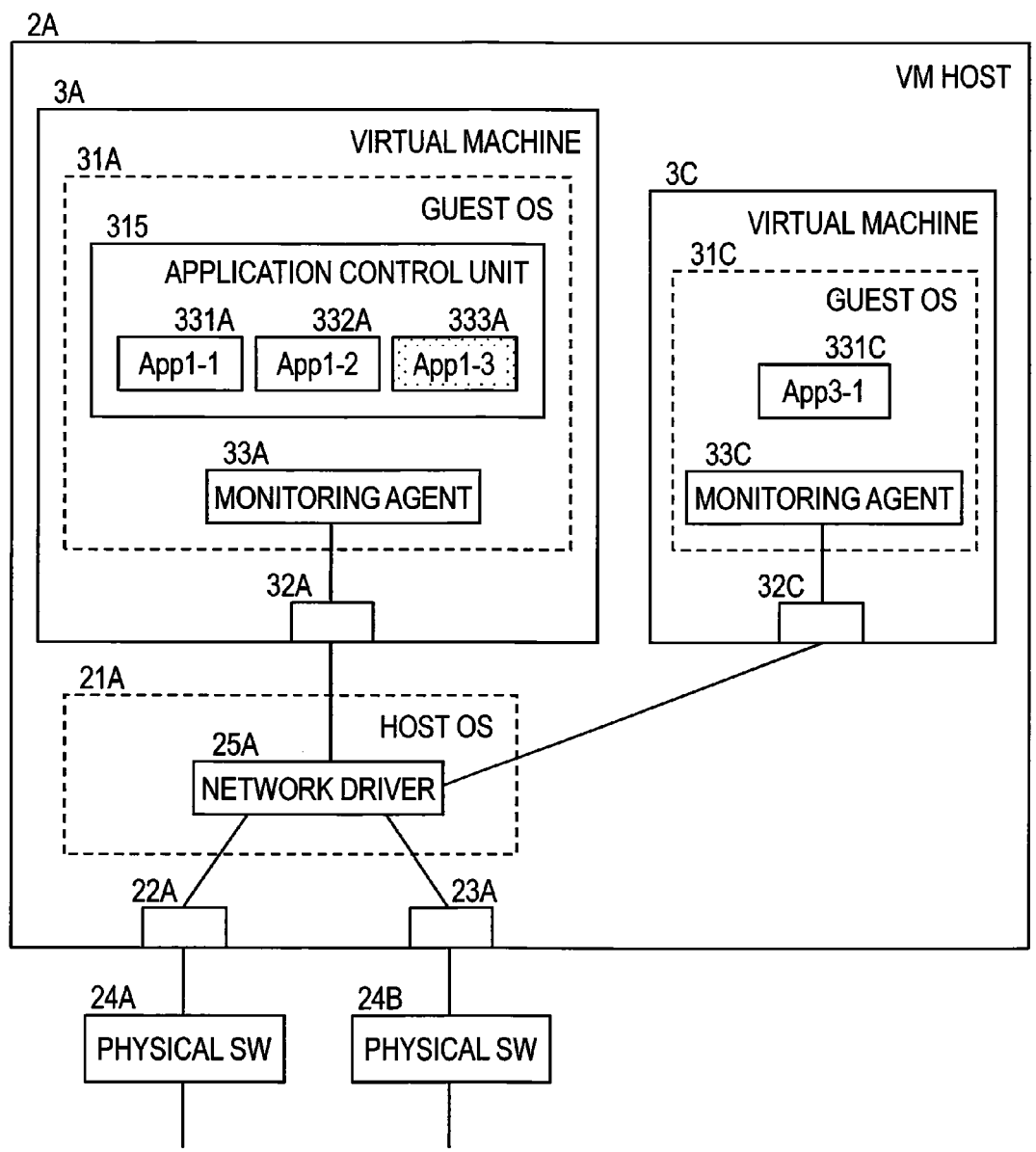
FIG. 12 is a diagram for explaining the network management process in the second embodiment.

Next, a second embodiment will be described. FIG. 12 is a diagram for explaining the network management process in the second embodiment. FIGS. 13A to 13D are diagrams for explaining the management information and bandwidth information in the second embodiment. The network management process of FIG. 12 will be described with reference to FIGS. 13A to 13D.

FIG. 12 illustrates an example in which a plurality of virtual machines are created in the same VM host 2A. The number of virtual machines in the VM host 2A increases when, for example, a new virtual machine 3C is created in the VM host 2A by migration from another VM host. The VM host 2A in the example of FIG. 12 has a configuration in which the virtual machine 3A and virtual machine 3C share the same physical NIC (physical NIC 22A and physical NIC 23A). Therefore, in some cases, there may be a shortage of communication bandwidth used by the application in the virtual machine 3A because of the new virtual machine 3C executing an application.

Namely, a shortage of communication bandwidth needed for applications to run may occur not only because of a failure in the communication line of the VM host 2A (the case described in the first embodiment), but also due to an increase in the virtual machines in the VM host 2A, for example. The number of virtual machines in the VM host 2A increases not only by migration as noted above, but also when a new guest OS is created in the VM host 2A.

In FIG. 12, the virtual machine 3A and virtual machine 3C are created in the VM host 2A. FIG. 12 depicts applications (APP1-1 to APP1-3) on the guest OS 31A of the virtual machine 3A, and an application control unit 315 that controls, i.e., starts up or stops, the applications. A virtual NIC 32A of the virtual machine 3A is virtually connected to the physical NIC 22A and physical NIC 23A of the VM host 2A via a network driver 25A. The guest OS 31A includes a monitoring agent 33A, as with the first embodiment.

The virtual machine 3C in FIG. 12, on the other hand, is a virtual machine newly created in the VM host 2A by migration, for example, and includes an application (APP3-1). A virtual NIC 32C of the virtual machine 3C is virtually connected to the physical NIC 22A and physical NIC 23A of the VM host 2A via the network driver 25A. The guest OS 31C of the virtual machine 3C includes a monitoring agent 33C. Further, in the example of FIG. 12, the physical NIC 22A is connected to a physical switch 24A, while the physical NIC 23A is connected to a physical switch 24B.

[Specific Example of Selection of Applications to be Stopped (2)]

FIG. 13A illustrates a specific example of management information created by the guest OS 31A of the virtual machine 3A. FIG. 13B illustrates a specific example of management information created by the guest OS 31C of the virtual machine 3C. In FIG. 13A, as with the case of FIG. 11A, APP1-1 has a priority of "1" and a requisite bandwidth of "1000 (MB)". APP1-2 has a priority of "10" and a requisite bandwidth of "500 (MB)". APP1-3 has a priority of "20" and a requisite bandwidth of "500 (MB)". As with the case of FIG. 11A, the current status of APP1-1 and APP1-2 is "online", which means they are operating, and the current status of APP1-3 is "offline", which means it is stopped. Therefore, the communication bandwidth needed by the applications on the guest OS 31A is "1500 (MB)", which is the sum of "1000 (MB)" used by APP1-1 and "500 (MB)" used by APP1-2.

In FIG. 13B, on the other hand, APP3-1 has a priority of "5" and a requisite bandwidth of "1000 (MB)". The current status of APP3-1 is "online", which means it is operating. Therefore, the communication bandwidth needed by the application on the guest OS 31C is "1000 (MB)" used by APP3-1.

Next, the information on communication bandwidth acquired by the host OS will be explained. FIG. 13C illustrates a specific example of bandwidth information acquired by the host OS.

FIG. 13C indicates that the bandwidth available to the physical NIC 22A is "1000 (MB)", while the bandwidth available to the physical NIC 23A is "1000 (MB)". Namely, the communication bandwidth currently available to the applications running on the guest OS 31A of the VM host 2A is "2000 (MB)", which is the sum of "1000 (MB)" for the physical NIC 22A and "1000 (MB)" for the physical NIC 23A. That is, before the virtual machine 3C was created in the VM host 2A, the communication bandwidth needed by the applications running on the guest OS 31A was "1500 (MB)", which was lower than the currently available communication bandwidth of "2000 (MB)". Therefore, before the creation of the virtual machine 3C, the communication bandwidth needed by APP1-2 and APP1-2 running on the guest OS 31A could be secured.

Next, selection by the host OS 21A of applications will be explained. FIG. 13D illustrates a specific example of management information renewed by the host OS 21A.

When a new guest OS is created in the VM host 2A, the host OS 21A receives a management packet containing management information of the created guest OS. Therefore, in the case of FIG. 13D, unlike that of FIG. 11C, the application selection unit 213 needs to select an application to be stopped based on both of the management information created by the guest OS 31A and the management information created by the guest OS 31C. More specifically, in the case of FIG. 13D, APP3-1 of the guest OS 31C has a priority of "5". It means APP3-1 has a higher priority than APP1-2 with a priority of "10" and APP1-3 with a priority of "20".

According to FIG. 13D, the requisite bandwidths of APP1-1, APP3-1, and APP1-2 are "1000 (MB)", "1000 (MB)", and "500 (MB)", respectively. Therefore, the sum of communication bandwidth needed by the applications currently running on the guest OS 31A of the VM host 2A is "2500 (MB)", the sum of these.

Therefore, the currently available communication bandwidth calculated from FIG. 13C is lower than the sum of communication bandwidth needed by the running applications. Accordingly, the application selection unit 213 selects APP1-2, which has a lowest priority among the running applications, as the application to be stopped (S24). This way, the application selection unit 213 is able to control the communication bandwidth needed by the applications running on the guest OS 31A to fall within the range of the currently available communication bandwidth, by stopping the operation of APP1-2. The application selection unit 213 thus ends selection of application to be stopped.

Next, the application selection unit 213 renews the information in the management information regarding the selected application (S25). In the example of FIG. 13D, the application selection unit 213 renews the current status of APP1-2, which is the selected application, from "online" to "to be offline". This allows the guest OS 31A, which receives the renewed management Information, to stop an application that has to be stopped by extracting an application whose current status is "to be offline" from the management information. Accordingly, the guest OS 31A can carry on the operation of high priority applications running on the guest OS 31A.

[Third Embodiment]

Figure 14:
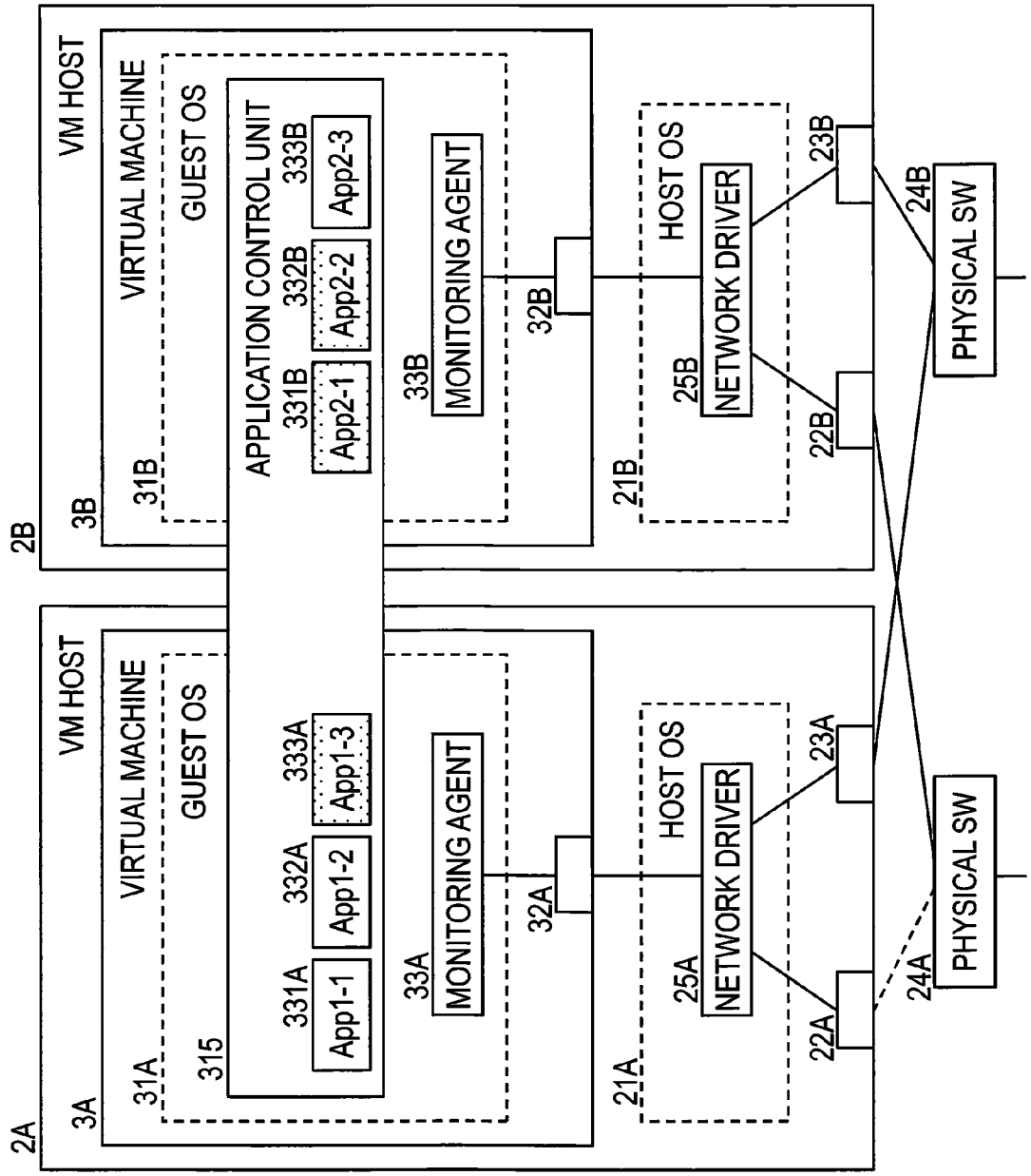
FIG. 14 is a diagram for explaining the network management process in the third embodiment.

Next, a third embodiment will be described. FIG. 14 is a diagram for explaining the network management process in the third embodiment. FIGS. 15A to 15C are diagrams for explaining the management information and bandwidth information in the third embodiment. The network management process of FIG. 14 will be described with reference to FIGS. 15A to 15C.

FIG. 14 depicts an example in which applications that run on the guest OS 31A of the virtual machine 3A and applications that run on the guest OS 31B of the virtual machine 3B form a duster system. More specifically, the guest OS 31A and guest OS 31B both have the same applications installed therein, as with the case of FIG. 5. The application control unit 315 configured to bridge between the guest OS 31A and guest OS 31B controls the respective applications installed in the guest OS31A and guest OS 31B. In the duster system of FIG. 14, the applications of the normal system (e.g., APP1-1, APP1-2, and APP1-3 of the guest OS 31A) operate in the normal time. When an abnormality occurs in the applications of the normal system, the application control unit 315 switches the applications of the normal system to the applications of the standby system (e.g., APP2-1, APP2-2, and APP2-3 of the guest OS 31B) and makes them run. The guest OS 31A includes a monitoring agent 33A, and the guest OS 31B includes a monitoring agent 33B. Other elements will not be described in detail here, as they were explained with reference to FIG. 5 or FIG. 12.

[Specific Example of Selection of Applications to be Stopped (3)]

FIG. 15A illustrates a specific example of management information created by the guest OS 31A of the virtual machine 3A. In FIG. 15A, as with the case of FIG. 11A, the communication bandwidth needed for operation of the applications on the guest OS 31A is "1500 (MB)", which is the sum of "1000 (MB)" used by APP1-1 and "500 (MB)" used by APP1-2.

The management information in FIG. 15A includes switching information, unlike the one in FIG. 11A. This switching information indicates whether or not applications in a guest OS in another VM host that forms the duster system are to be started up, when the application control unit 315 of the guest OS 31A stops applications. In FIG. 15A, the switching status of APP1-1 is "fail over", which means the application in the guest OS in another VM host that forms the duster system is to be started up when the application is stopped. The switching statuses of APP1-2 and APP1-3 is "stop", which means the applications in another guest OS are not to be started up when the applications are stopped. Other items will not be described in detail here, as they were explained with reference to FIG. 11A and others.

If the requisite bandwidth is no longer secured due to a failure or the like in communication lines, applications may stop. In such a case, high priority applications need to be kept running, by being switched to another guest OS that forms the duster system. On the other hand, low priority applications (e.g., less time-pressed applications) need not always be switched to another guest OS. Moreover, load concentration on another guest OS by the switching of applications needs to be avoided. Therefore, the applications are each labeled either with "fail over" or "stop" in accordance with the priority or the like of the applications, so that they can be switched over while enough resources are still available.

Next, referring to FIG. 15B, the communication bandwidth available to the applications running on the guest OS is "1000 (MB)", as with the case in FIG. 11B. Accordingly, referring to FIG. 15C, the application selection unit 213 selects APP1-2 as the application to be stopped, as with the case in FIG. 11C.

The application control unit 315 that has received the renewed management information from the guest OS 31A looks up the switching information of APP1-2 in the management information, and only stops APP1-2 in the virtual machine 3A, without starting up APP1-2 in the virtual machine 3B (without switching of the application).

The switching Information is not renewed in the host OS 21A. Therefore, the guest OS 31A may create the management information without containing the switching Information. In this case, the guest OS 31A may stop or switch over an application, by looking up the switching information when deciding whether to stop or switch over an application.

In this embodiment, the application control unit 315 is capable of only stopping an application selected by the host OS 21A when that application need not be switched over to another guest OS. Therefore, resources such as communication bandwidth on the guest OS that is the switching destination can be saved.

[Fourth Embodiment]

Next, a fourth embodiment will be described. FIGS. 16A to 16C are diagrams for explaining the management information and bandwidth information in the fourth embodiment.

The fourth embodiment enables high priority applications to be always switched over to another host OS, from one to another of virtual machines that form a duster system such as the one depicted in FIG. 14. Namely, in the fourth embodiment, the communication bandwidth used to run high priority applications is always secured in another host OS that forms the duster system.

More specifically, as depicted in FIG. 16A, the management information in the fourth embodiment includes bandwidth securement information on whether or not to secure communication bandwidth needed to operate an application even during a period in which the application is stopped. If there is an application labeled "yes" as bandwidth securement information, which Indicates the necessity of securing communication bandwidth, the application selection unit 213 secures the bandwidth for that application.

Namely, when switching an application due to a failure or the like in the communication line, there may be a case where there is not enough communication bandwidth for the backup application to start up on another guest OS that forms the duster system. In this case, switching the application may affect other applications running on another guest OS. Therefore, by labeling the application that has "fall over" as the switching information with "yes" as the bandwidth securement information, the application can be switched over without affecting other applications.

[Specific Example of Selection of Applications to be Stopped (4)]

FIG. 16A Illustrates a specific example of management information created by the guest OS 31A in FIG. 14. In FIG. 16A, the communication bandwidth needed for operation of applications on the guest OS 31A is "500 (MB)" used by APP1-3 only. Referring to FIG. 16A, APP1-1 has "fail over" as the switching information, and is stopped on the guest OS 31A. This means that APP1-1 is currently running on another guest OS that forms the duster system. Since APP1-1 has "yes" as the bandwidth securement information, the guest OS 31A has to secure communication bandwidth needed by APP1-1 so that it can start up APP1-1 any time when the application is switched over. Therefore, the application selection unit 213 works out "1500 (MB)", which is the sum of "1000 (MB)" that is the communication bandwidth needed by APP1-1 although it is now stopped, and "500 (MB)", which is the communication bandwidth of the currently running APP1-3.

On the other hand, referring to FIG. 168, the communication bandwidth available to the applications running on the guest OS 31A is "1000 (MB)", as with the case in FIG. 11B. Therefore, the sum of communication bandwidth that needs to be secured to be used by the application, and the communication bandwidth needed for operation of the currently running application exceeds the currently available communication bandwidth. Accordingly, referring to FIG. 16C, the application selection unit 213 renews the current status of APP1-3, which has a lowest priority among APP1-1 to APP1-3, from "online" to "to be offline". Other items such as "priority" will not be described in detail here, as they were explained with reference to FIG. 11A and others.

According to this embodiment, the application selection unit 213 works out the sum of communication bandwidth that needs to be secured for the application although it is currently stopped, and the communication bandwidth needed by the currently running application. The application selection unit 213 then selects an application to be stopped such that the calculated sum will be lower than the bandwidth currently available to the VM host 2A. Thereby, the communication bandwidth used for operation of high priority applications can be secured even when applications are switched over due to a failure or the like in the communication line.

[Fifth Embodiment]

Next, a fifth embodiment will be described. FIGS. 17A to 17C are diagrams for explaining the management information and bandwidth Information in the fifth embodiment.

In the fifth embodiment, even if the management information Indicates the current status of an application as "online", the communication bandwidth for that application is allocated to another application during a dormant period in which that application does not operate.

More specifically, as depicted in FIG. 17A, the management information in the fifth embodiment includes time block information (hereinafter also referred to as dormant period information) on a time block in which the application does not perform communication (or a time block in which the application performs communication). The application selection unit 213 looks up the dormant period information, and if there is an application whose dormant period contains the current time (time at which an application to be stopped is selected), the application selection unit determines that the application is stopped and selects it.

[Specific Example of Selection of Applications to be Stopped (5)]

FIG. 17A Illustrates a specific example of management Information created by the guest OS 31A in FIG. 8, for example. In FIG. 17A, as with the case of FIG. 11A, the communication bandwidth needed for operation of the applications on the guest OS 31A is "1500 (MB)", which is the sum of "1000 (MB)" used by APP1-1 and "500 (MB)" used by APP1-2. Referring to FIG. 17B, the communication bandwidth available to the applications running on the guest OS 31A is "1000 (MB)", as with the case in FIG. 11B.

If, for example, the time when the application selection unit 213 selects an application is "8:00", this is contained in the dormant period of APP1-2, according to the dormant period information in FIG. 17A. Therefore, the application selection unit 213 works out "1000 (MB)", by subtracting "500 (MB)", which is the communication bandwidth of dormant APP1-2, from "1500 (MB)", which is the sum of communication bandwidth needed by running applications. Since the calculated "1000 (MB)" does not exceed "1000 (MB)", the currently available communication bandwidth, the application selection unit 213 does not select an application to be stopped.

Namely, if there is a dormant application, the application selection unit 213 works out a value by subtracting the communication bandwidth of the dormant application from the sum of communication bandwidth needed by running applications. The application selection unit 213 then selects an application to be stopped such that the value obtained by subtraction is lower than the currently available communication bandwidth (falls within the range of currently available communication bandwidth). This enables efficient use of the communication bandwidth and more applications to run at the same time. The application selection unit 213 may determine that an application is stopped only if there is more than a certain time left (e.g., an hour or more) of the dormant period of the application, and select the application.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the Invention. Although one or more embodiments of the present invention have been described in detail, it should be understood that the various changes, substitutions, and alterations could be made hereto without departing from the spirit and scope of the invention.

What is claimed is:

1. A network management device comprising:
a processor coupled to the memory, the processor configured to:
receive a management packet from a virtual machine, the management packet containing management information that includes a combination of priority of applications operable on the virtual machine and information on communication bandwidth used for operation of the applications; and
when a sum of communication bandwidth used for running applications is higher than currently available communication bandwidth for running applications based on the information on communication bandwidth, due to a decrease in the currently available communication bandwidth in accordance with any migration of other virtual machines to a physical machine on which the virtual machine operates and failure occurrence in the physical machine, repeatedly select an application to be stopped based on the management information until a sum of communication bandwidth used for running applications excluding selected applications is lower than the currently available communication bandwidth, and
transmit a reply packet containing information on the repeatedly selected application to the virtual machine, in order for the virtual machine to stop the repeatedly selected application.

2. The network management device according to claim 1, wherein the processor preferentially selects a lower priority application as the application to be stopped.

3. The network management device according to claim 1, wherein, when a new virtual machine is created in a physical machine in which the virtual machine has been created, the processor receives a management packet containing management information of the new virtual machine.

4. The network management device according to claim 3, wherein creation of a new virtual machine in the physical machine includes a migration of a virtual machine from another physical machine to the physical machine, and a creation of a new virtual machine in the physical machine.

5. The network management device according to claim 1, wherein
the virtual machine forms a cluster with a another virtual machine in another physical machine that has the same application as an application of the virtual machine, and
when stopping an application in the virtual machine, the processor starts up an application in another virtual machine corresponding to the application that is stopped.

6. The network management device according to claim 5, wherein
the management information further includes switching information on whether or not the application in the virtual machine is started up when the application of the other virtual machine is stopped, and
the processor determines whether or not to start up the application in the virtual machine of the other physical machine based on the switching information.

7. The network management device according to claim 1, wherein
the management information further includes bandwidth securement information on whether or not to secure communication bandwidth needed to operate the application of the virtual machine during a period in which the application of the other machine is stopped, and the processor selects an application to be stopped such that a value obtained by adding communication bandwidth that needs to be secured for the application to the sum of communication bandwidth is lower than the currently available communication bandwidth.

8. The network management device according to claim 1, wherein
the management information further includes time block information on a time block in which the application of the virtual machine performs communication, and
the processor selects an application to be stopped such that, during a time block in which the application of the virtual machine does not perform communication, a value obtained by subtracting communication bandwidth of the application that does not perform communication from the sum of communication bandwidth is lower than the currently available communication bandwidth.

9. An information processing system comprising:
a physical machine on which a virtual machine is deployed; and
a network management device capable of communicating with the virtual machine; the physical machine including:
a first memory; and
a first processor coupled to the first memory, the first processor configured to:
create a management packet containing management information that includes a combination of priority of applications operable on the virtual machine and information on communication bandwidth used for operation of the applications; and
transmit the management packet to the network management device, the network management device including:
a second memory; and
a second processor coupled to the second memory, the second processor configured to:
receive the management packet,
when a sum of communication bandwidth used for running applications is higher than currently available communication bandwidth for running applications based on the information on communication bandwidth, due to a decrease in the currently available communication bandwidth in accordance with any migration of other virtual machines to a physical machine on which the virtual machine operates and failure occurrence in the physical machine, repeatedly select an application to be stopped based on the management information until a sum of communication bandwidth used for running applications excluding selected applications is lower than the currently available communication bandwidth,
transmit a reply packet containing information on the repeatedly selected application to the virtual machine, and
stop the repeatedly selected application based on information in the reply packet.

10. A non-transitory computer-readable storage medium storing a program for causing a computer to execute a process comprising:
receiving a management packet from a virtual machine, the management packet containing management information that includes a combination of priority of applications operable on the virtual machine and information on communication bandwidth used for operation of the applications;

when a sum of communication bandwidth used for running applications is higher than currently available communication bandwidth for running applications based on the information on communication bandwidth, due to a decrease in the currently available communication bandwidth in accordance with any migration of other virtual machines to a physical machine on which the virtual machine operates and failure occurrence in the physical machine, repeatedly select an application to be stopped based on the management information until a sum of communication bandwidth used for running applications excluding selected applications is lower than the currently available communication bandwidth; and transmitting a reply packet containing information on the repeatedly selected application to the virtual machine, in order for the virtual machine to stop the repeatedly selected application.

\* \* \* \* \*